2,994,697
NEW DYESTUFFS OF THE 1,8-NAPHTHALENE DICARBOXYLIC ACID SERIES

Wilhelm Eckert, Frankfurt am Main, Otto Fuchs, Hofheim (Taunus), and Friedrich Raizner and Heinz Rentel, Frankfurt am Main, Germany, assignors to Farbwerke Hoechst Aktiengesellschaft vormals Meister Lucius & Brüning, Frankfurt am Main, Germany, a corporation of Germany
No Drawing. Filed Apr. 15, 1958, Ser. No. 728,554
Claims priority, application Germany Apr. 20, 1957
3 Claims. (Cl. 260—282)

The present invention relates to new dyestuffs of the 1,8-naphthalene dicarboxylic acid series and to a process for preparing them; more particularly it relates to dyestuffs corresponding to the following formula

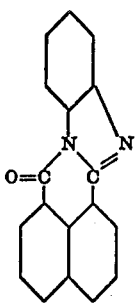

wherein the benzene nucleus may be substituted by a halogen atom, an alkyl, alkoxy, hydroxyl or carboxylic acid group or by the group O—$CH_2$—$CH_2$—OH and the naphthalene nucleus may be substituted by a hydroxyl or carboxylic acid group, and wherein at least one of the two nuclei contains at least one free hydroxyl or carboxylic acid group.

In French Patent No. 1,111,620 is described a process for dyeing synthetic fibers, inter alia polyester fibers, with condensation products of 1,8-naphthalene dicarboxylic acid or its anhydride and unsubstituted or substituted aromatic ortho-diamines. The dyestuffs disclosed in the examples of this patent contain a chlorine atom, a methyl or methoxy group as substituent in the benzene nucleus of the ortho-diamine.

Reworking of these examples revealed that the dyestuffs described have a good affinity for polyester fibers and that the dyeing produced possess a good fastness to wet processing and to ironing, but their resistance to hot-air fixation (fastness to thermofixation) is only moderate. On account of this deficiency the dyestuffs are not suitable for use on a broader scale in the textile industry since in practice most of the dyeings are subjected to a hot-air fixation.

Now we have found that dyestuffs possessing an excellent fastness to thermofixation and very good general fastness properties are obtained by condensing a 1,8-naphthalene dicarboxylic acid or its anhydride with an aromatic ortho-diamine in such a manner that the dyestuff formed contains at least one free hydroxyl or carboxylic acid group. The hydroxyl or carboxylic acid group can be introduced into the dyestuff molecule by condensing a 1,8-naphthalene dicarboxylic acid with an aromatic ortho-diamine which contains a hydroxyl or carboxylic acid group in the benzene nucleus or a hydroxyl group in a side chain. It is also possible to condense 1,8-naphthalene dicarboxylic acid substituted in the naphthalene nucleus by a hydroxyl or carboxylic acid group, with a substituted or unsubstituted aromatic ortho-diamine. It is essential that at least one free hydroxyl or carboxylic acid group is present in the dyestuff molecule.

The dyestuffs can be prepared in boiling organic solvents, such as pyridine, glacial acetic acid, chlorobenzene or ortho-dichlorobenzene or even in water under pressure.

The new dyestuffs dye fibers and foils of aromatic polyesters, especially polyethylene terephthalates, greenish yellow to golden orange tints which are distinguished by very good properties of fastness, especially by an excellent fastness to thermofixation. The dyeings can be produced from an aqueous bath with the addition of a carrier, for example ortho-phenylphenol or others, at a temperature near the boiling point or advantageously without the addition of a carrier at a temperature above 100° C. under pressure. The dyestuffs are also very suitable for printing fabrics of polyesters.

The following examples serve to illustrate the invention but they are not intended to limit it thereto, the parts being by weight:

Example 1

A mixture of 19.8 parts of naphthalic acid anhydride, 16.5 parts of 3,4-diaminobenzene-1-carboxylic acid and 150 parts of glacial acetic acid is heated at the boil for 3 hours. The dyestuff which crystallizes out on cooling is filtered off with suction, washed with methanol and dried. It dyes polyester fibers from an aqueous dispersion greenish yellow tints of an excellent fastness to thermofixation.

Example 2

19.8 parts of naphthalic acid anhydride are heated at the boil for several hours with 19 parts of 3,4-diaminophenyl-beta-hydroxyethylether in 300 parts of chlorobenzene. The dyestuff which precipitates from the solution can be used for dyeing and printing fabrics of polyesters brilliant greenish yellow tints. As compared with the dyestuff obtainable from naphthalic acid anhydride and 3,4-diamino-1-ethoxybenzene it is distinguished by its excellent fastness to thermofixation and to ironing.

Example 3

21.4 parts of 3-hydroxynaphthalic acid anhydride are heated at the boil for 2 hours with 16 parts of 3,4-diaminobenzene-1-carboxylic acid in 200 parts of glacial acetic acid. When the solution is cooled, well formed yellow leaflets precipitate which can be recrystallized from a mixture of dimethylformamide and water. Polyester fibers are dyed from an aqueous dispersion greenish yellow tints of very good properties of fastness.

Example 4

When 16 parts of 3,4-diamino-1-chlorobenzene are used instead of 3,4-diaminobenzene-1-carboxylic acid indicated in Example 3, a dyestuff is obtained which dyes polyester fibers greenish yellow tints of an excellent fastness to thermofixation.

When 3-hydroxynaphthalic acid is reacted with 3,4-diamino-1-bromobenzene under the conditions described in Example 3, there is likewise obtained a greenish yellow dyestuff of very good properties of fastness.

Example 5

21.4 parts of 3-hydroxynaphthalic acid anhydride and 17 parts of 3,4-diaminophenyl-beta-hydroxyethylether are heated at the boil for 2 hours in 200 parts of glacial acetic acid. The mixture is worked up and a crystalline greenish yellow dyestuff is obtained which is very suitable for dyeing and printing fabrics of polyesters on account of its very good properties of fastness.

Example 6

When in Example 5 3,4-diamino-1-ethoxybenzene is used instead of 3,4-diaminophenyl-beta-hydroxyethylether, there is likewise obtained a greenish yellow dyestuff which has the same very good properties of fastness.

Example 7

10 parts of naphthalene-1,4,5-tricarboxylic acid anhydride are heated at the boil for some hours with 5 parts of ortho-phenylenediamine in 50 parts of pyridine. After cooling, the dyestuff formed is precipitated from the brown solution by means of dilute hydrochloric acid. It can be purified by dissolving it in dilute caustic soda solution and reprecipitating it with a mineral acid after the solution has been clarified. Polyester fibers are dyed from an aqueous dispersion greenish yellow tints of very good properties of fastness.

Example 8

30 parts of naphthalene-1,4,5-tricarboxylic acid are heated in an autoclave at 150–160° C. for 5 hours with 23 parts of 3,4-diaminophenyl-beta-hydroxyethylether in 300 parts of water. The dyestuff which can readily be isolated after cooling yields on polyethylene glycol terephthalate fibers yellow dyeings of an excellent fastness to thermofixation.

When 21 parts of 3,4-diamino-1-ethoxybenzene are used instead of 3,4-diaminophenyl-beta-hydroxyethyl-ether, a beautiful golden yellow dyeing of the same fastness properties is obtained. With the use of 3,4-diamino-1-methoxybenzene a dyestuff is obtained which likewise yields golden-yellow tints.

We claim:

1. The dyestuff corresponding to the following formula

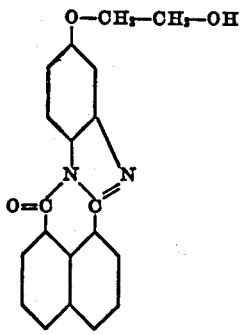

2. The dyestuff corresponding to the following formula

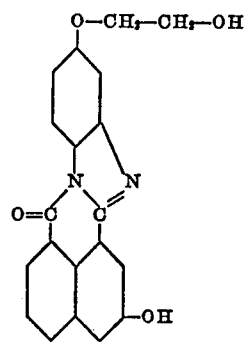

3. The dyestuff corresponding to the following formula

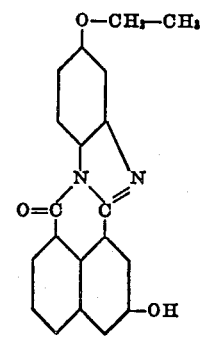

References Cited in the file of this patent

UNITED STATES PATENTS 2,820,037    Schmidt-Nickels _____ Jan. 14, 1958

FOREIGN PATENTS 1,111,620    France _____ Mar. 2, 1956

OTHER REFERENCES

Lubs. Chem. of Synthetic Dyes and Pigments, Reinhold, N.Y., 1955, pp. 670 and 671.

Schroeder et al.: Textile Research Journal, vol. XXXVII, No. 4, April 1957, pages 275–281.